July 2, 1946.　　　F. SIROLA　　　2,403,405
TURRET HEAD FOR LATHES
Filed July 26, 1945　　　2 Sheets-Sheet 1
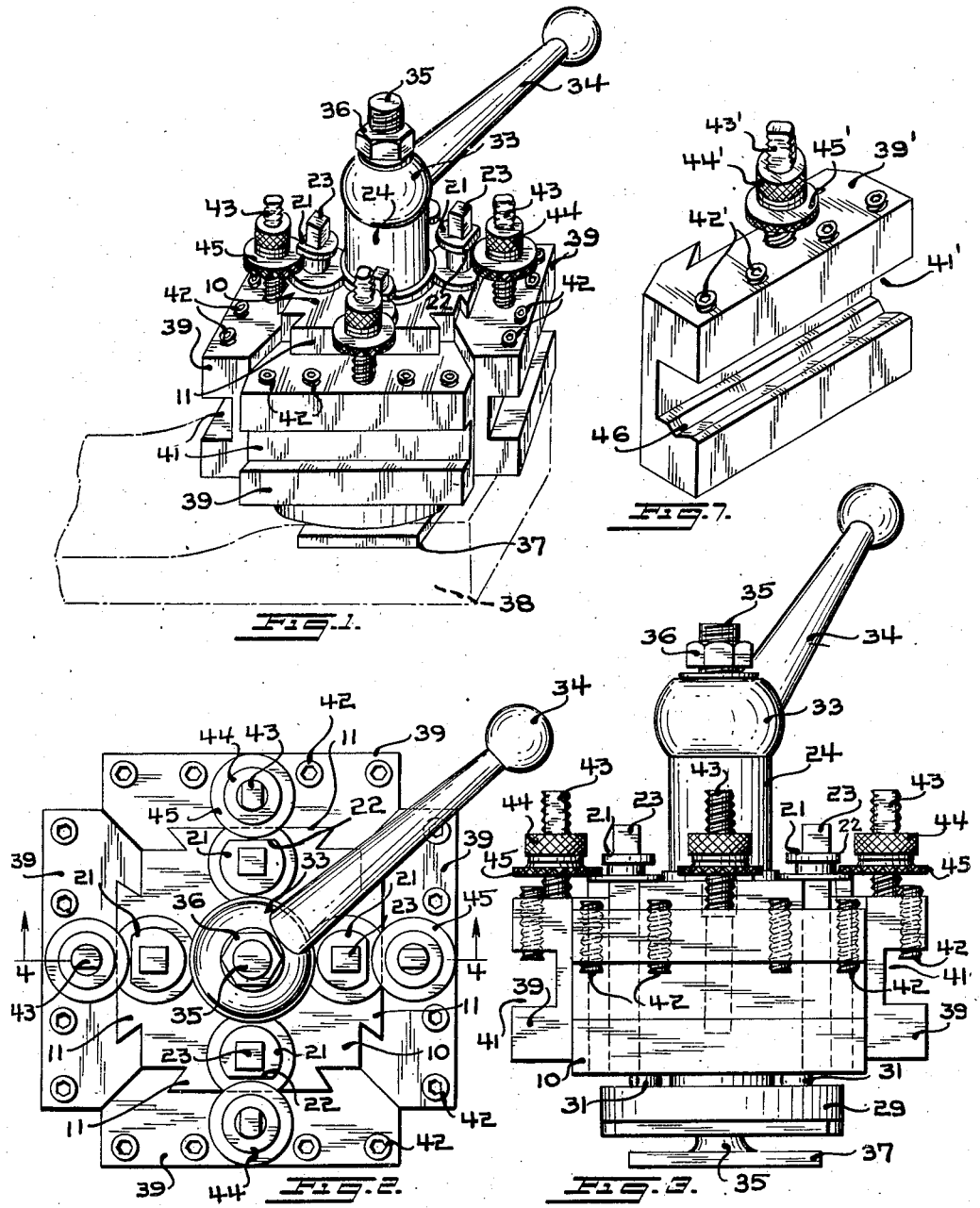
INVENTOR
FRANK SIROLA
BY
ATTORNEY July 2, 1946.   F. SIROLA   2,403,405
TURRET HEAD FOR LATHES
Filed July 26, 1945.   2 Sheets-Sheet 2
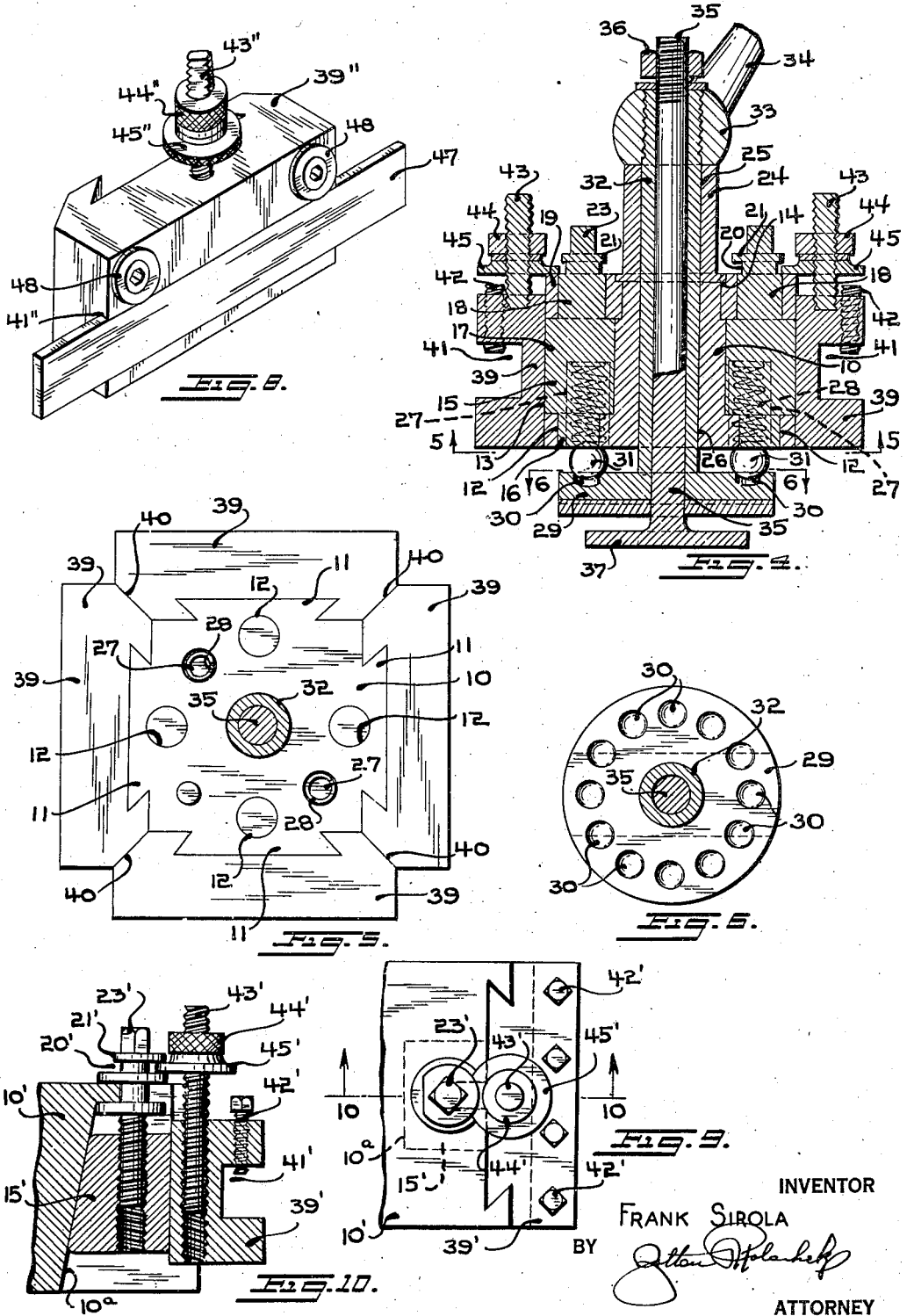
INVENTOR
FRANK SIROLA
BY
ATTORNEY Patented July 2, 1946

2,403,405

UNITED STATES PATENT OFFICE 2,403,405

TURRET HEAD FOR LATHES

Frank Sirola, New York, N. Y.

Application July 26, 1945, Serial No. 607,236

6 Claims. (Cl. 29—48)

This invention relates to new and useful improvements in a turret head for lathes.

More specifically, the invention proposes the construction of an improved turret head which is characterized by tool holders in which the tools may be horizontally adjusted, and in which the tool holders themselves are vertically adjustable for vertical adjustment of the tools.

Still further, it is proposed to provide a turret head, as aforesaid, including a four-sided body, each of sides being provided with a vertical dove-tail tongue, tool holders vertically slidable on the tongues and each having an upstanding screw on which a nut is threaded, the nuts having flanges bearing against the top face of the body and being adapted to coact with slotted eccentrics which hold the nuts against vertical movement, thereby inducing vertical movement of the tool holders upon rotation of the nuts.

Another object is to provide a tool holder for the aforesaid turret head especially adapted to hold a boring tool.

Another object is to provide a tool holder for the aforesaid turret head especially adapted to hold a cutting or parting tool.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a turret head constructed in accordance with this invention, a lathe being indicated fragmentally in dot-dash lines.

Fig. 2 is a plan view of the head of Fig. 1.

Fig. 3 is a side view of the head of Fig. 1.

Fig. 4 is a section on the line 4—4 of Fig. 2, parts being shown in full.

Fig. 5 is a section on the line 5—5 of Fig. 4.

Fig. 6 is a section on the line 6—6 of Fig. 4.

Fig. 7 is a perspective view of a boring tool holder adapted to be used in place of the tool holder of the head shown in Fig. 1.

Fig. 8 is a perspective view of a cutting or parting tool holder adapted to be used in place of the tool holder of the head shown in Fig. 1, a parting tool being shown assembled with the tool holder.

Fig. 9 is a fragmentary top plan view showing a modified form of the invention.

Fig. 10 is a vertical sectional view taken on line 10—10 of Fig. 9.

The turret head for lathes, in accordance with this invention includes a body or carrier 10, adapted to be mounted upon a lathe A (Fig. 1), and having a plurality of vertical dove-tail tongues 11, one of each of the four sides of the carrier.

At the center of each of the tongues, the carrier has a bore provided with several diameters. That is, at the bottom of the carrier is a short bore 12, thereabove a larger bore 13 opening at one side through the side of the tongue and thereabove a still larger bore 14 also opening at one side through the side of the tongue. The bores are aligned and in each set of aligned bores is an eccentric pin 15 having a journal 16 in bore 12, a cam 17 in bore 13, and a journal 18 in a disc 19 in bore 14. Above the journal 18 the pin has a groove 20 and thereabove, forming the top wall of the groove, an integral disc 21 having a flat side 22. Above disc 21 the pin has a head 23 for a wrench. There are four pins.

A filler piece 24 rests on top of the carrier and has a flange overlapping each of the discs 19, holding them in place on the carrier. Filler piece 24 has a central bore in line with a central bore 26 in the carrier. The carrier further has two diametrically opposed bores 27 forming recesses for coil springs 28, the bores 27 opening through the bottom of the carrier. A disc 29 is disposed below the carrier, and this disc has a circular row of sockets 30 adapted to align with the bores 27. A ball 31 is retained in each bore 27 and the aligned socket 30 and is spring pressed toward the socket 30 by the spring 28. A sleeve 32, integral with the disc 29, extends upwardly through the bores 26 and 25 and above the filler piece where it is threaded. A hub 33 is threaded on the threaded end of the sleeve and tightened sufficiently to prevent the balls 31 from falling out between the bottom of the carrier and the disc 29. A handle 34 is integral with the hub for operating same. Hub 33 acts as a nut, bolting down the filler piece.

A stem 35 is disposed in the hollow interior of the sleeve and extends through and below the disc 29. The upper end of the stem is threaded and a nut 36 is screwed thereon. The lower end lies below the disc 29 and is integral with a slide block 37 adapted to be employed for securing the turret head with a lathe 38 in the usual manner. The slide block can be quickly secured in or removed from the lathe merely by turning the handle 34 to loosen the hub 33. After the turret is connected to the lathe, the turret may be turned to different positions, the balls riding from one pair of opposed sockets 30 to another.

A tool holder 39 is vertically slidably mounted on each of the tongues, the holders 39 each having a dove tail groove for this purpose. The holders 39 engage each other at their ends along mitered edges 40, as is clearly shown in Fig. 5, this construction insuring strong backing for the tool holder being used.

Each tool holder has a horizontal groove 41 for receiving a tool (not shown). That is, each tool holder is channel shaped in vertical cross section. Set screws 42 are provided in the top wall of the groove for use in securing the tool in place. Each tool holder has four set screws, as is clearly shown in Fig. 2. Each tool holder also has extending upwardly from its center, a threaded stud 43 flat along two opposite sides. A nut 44 is threaded on each stud 43, each nut having a roughed part for use in tightening it manually or with a wrench. Each nut 44 also has a flange 45 extending into the adjacent groove 20.

The operation of the turret head is as follows:

First the tools are secured in the tool holders by merely placing them in the grooves in the tool holders and then securing them therein by means of the set screws 42. The turret head is then assembled with the lathe by means of the slide block 37, the handle 34 being turned first to loosen the sleeve so that the slide block can be slid into the lathe, and then to tighten it to lock the slide block in place.

Next, the tool holder being used must be adjusted vertically. To do this, the eccentric pin is turned by means of a wrench applied to the fitting or head 23 so that the flat side 22 is toward the flange 45. The nut 44 is then turned. As the nut 44 rests on top of the disc 19 the tool holder either raises or lowers depending upon the direction of rotation of the nut 44. When the proper vertical position has been reached, the wrench is turned, turning the eccentric pin so that the top wall or flange 21 overlies the flange 45, the flat side 22 then being rotated away from the flange 45. Thus the flange 45 is locked in the groove and the tool holder cannot move vertically. At the same time that the flat side 22 is rotated away from the flange 45, the cam 15 is rotated, jamming against the inner face of the tool holder and wedging the dove-tail tongue in the dove-tail groove, further securing the tool holder rigidly to the carrier.

The tool holder 39' may be used with the turret head in place of the tool holder 39 if desired, and the same is true of the tool holder 39'' of Fig. 8. The tool holder 39' distinguishes from the tool holder 39 in that the groove 41' has a V-shaped channel 46 in its bottom wall adapting it to hold a boring tool. The tool holder 39'' distinguishes from the tool holder 39 in that it has a shallow groove 41'' for holding a parting tool 47 and cam disc 48 are employed for holding the tool instead of the set screws.

Other parts of the tool holders of Figs. 7 and 8 corresponding to similar parts of the tool holder of Fig. 1 are indicated by like references with one or two accents added respectively.

In Figs. 9 and 10 a vertical sliding wedge 15' is shown to be operable by a bolt 33', against the inclined surface 10ª of the carrier 10'.

In other respects this form of the invention is similar to the previous form, and similar parts may be recognized by the same numerals with an accent added.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A turret head for a lathe comprising a carrier having four sides, each provided with a dove-tail tongue, a vertical bore adjacent each side and opening through the side of the adjacent tongue, and a central bore, slide block means in said central bore for connecting said head to said lathe, a tool holder slidably mounted on each of said tongues, each of said holders having a vertically upstanding threaded stud, an eccentric pin in each of said vertical bores, having journals at its ends, the bottom journals fitting in bearings in said carrier, each pin having a cam portion between said journals adapted to engage the inner face of the adjacent holder for locking said holder when said pin is rotated, a bearing disc on each pin top journal fitting in a recess in said carrier top wall, a nut threaded on each of said studs, each of said nuts having a flange abutting the top of the adjacent bearing disc and adapted, when said cam portion does not lock the holder, to move the holder vertically dependent upon the direction of rotation of said nut, each of said eccentric pins having a groove in which the adjacent nut flange fits, the top wall of said groove having one flat side adapted, when turned toward said adjacent nut, to leave the flange of the nut uncovered whereby when said eccentric pin is rotated to lock said holder by its said cam portion said top wall of said groove overlies said nut flange, and means overlying the inner edges of said bearing discs, holding them against said carrier.

2. A turret head for a lathe comprising a carrier having four sides, each provided with a dove-tail tongue, a vertical bore adjacent each side and opening through the side of the adjacent tongue, and a central bore, slide block means in said central bore for connecting said head to said lathe, a tool holder slidably mounted on each of said tongues, each of said holders having a vertically upstanding threaded stud, an eccentric pin in each of said vertical bores having journals at its ends, the bottom journals fitting in bearings in said carrier, each pin having a cam portion between said journals, adapted to engage the inner face of the adjacent holder for locking said holder when said pin is rotated, a bearing disc on each pin top journal fitting in a recess in said carrier top wall, a nut threaded on each of said studs, each of said nuts having a flange abutting the top of the adjacent bearing disc and adapted, when said cam portion does not lock the holder, to move the holder vertically dependent upon the direction of rotation of said nut, each of said eccentric pins having a groove in which the adjacent nut flange fits, the top wall of said groove having one flat side adapted, when turned toward said adjacent nut, to leave the flange of the nut uncovered whereby when said eccentric pin is rotated to lock said holder by its said cam portion said top wall of said groove overlies said nut flange, and means overlying the inner edges of said bearing discs, holding them against said carrier, said holders each including a horizontal slot for receiving a tool, and four studs for locking said tool in said slot.

3. A turret head for a lathe comprising a carrier having four sides, each provided with a dovetail tongue, a vertical bore adjacent each side and opening through the side of the adjacent tongue, and a central bore, slide block means in said central bore for connecting said head to said lathe, a tool holder slidably mounted on each of said tongues, each of said holders having a vertically upstanding threaded stud, an eccentric pin in each of said vertical bores having journals at its ends, the bottom journals fitting in bearings in said carrier, each pin having a cam portion between said journals, adapted to engage the inner face of the adjacent holder for locking said holder when said pin is rotated, a bearing disc on each pin top journal fitting in a recess in said carrier top wall, a nut threaded on each of said studs, each of said nuts having a flange abutting the top of the adjacent bearing disc and adapted, when said cam portion does not lock the holder, to move the holder vertically dependent upon the direction of rotation of said nut, each of said eccentric pins having a groove in which the adjacent nut flange fits, the top wall of said groove having one flat side adapted, when turned toward said adjacent nut, to leave the flange of the nut uncovered whereby when said eccentric pin is rotated to lock said holder by its said cam portion said top wall of said groove overlies said nut flange, and means overlying the inner edges of said bearing discs, holding them against said carrier, said holders each including a horizontal slot for receiving a tool, and four studs for locking said tool in said slot, each of said holders having a channel in the bottom wall of its slot.

4. A turret head for a lathe comprising a carrier having four sides, each provided with a dovetail tongue, a vertical bore adjacent each side and opening through the side of the adjacent tongue, and a central bore, slide block means in said central bore for connecting said head to said lathe, a tool holder slidably mounted on each of said tongues, each of said holders having a vertically upstanding threaded stud, an eccentric pin in each of said vertical bores having journals at its ends, the bottom journals fitting in bearings in said carrier, each pin having a cam portion between said journals adapted to engage the inner face of the adjacent holder for locking said holder when said pin is rotated, a bearing disc on each pin top journal fitting in a recess in said carrier top wall, a nut threaded on each of said studs, each of said nuts having a flange abutting the top of the adjacent bearing disc and adapted, when said cam portion does not lock the holder, to move the holder vertically dependent upon the direction of rotation of said nut, each of said eccentric pins having a groove in which the adjacent nut flange fits, the top wall of said groove having one flat side adapted, when turned toward said adjacent nut, to leave the flange of the nut uncovered whereby when said eccentric pin is rotated to lock said holder by its said cam portion said top wall of said groove overlies said nut flange, and means overlying the inner edges of said bearing discs, holding them against said carrier, each of said holders having a horizontal slot for receiving a parting tool and two cam washers for securing said tool in said slot.

5. A turret head for a lathe comprising a carrier having four sides, each provided with a dovetail tongue, a vertical bore adjacent each side and opening through the side of the adjacent tongue, and a central bore, slide block means in said central bore for connecting said head to said lathe, a tool holder slidably mounted on each of said tongues, each of said holders having a vertically upstanding threaded stud, an eccentric pin in each of said vertical bores having journals at its ends, the bottom journals fitting in bearings in said carrier, each pin having a cam portion between said journals adapted to engage the inner face of the adjacent holder for locking said holder when said pin is rotated, a bearing disc on each pin top journal fitting in a recess in said carrier top wall, a nut threaded on each of said studs, each of said nuts having a flange abutting the top of the adjacent bearing disc and adapted, when said cam portion does not lock the holder, to move the holder vertically dependent upon the direction of rotation of said nut, each of said eccentric pins having a groove in which the adjacent nut flange fits, the top wall of said groove having one flat side adapted, when turned toward said adjacent nut, to leave the flange of the nut uncovered whereby when said eccentric pin is rotated to lock said holder by its said cam portion said top wall of said groove overlies said nut flange, and means overlying the inner edges of said bearing discs, holding them against said carrier, said slide block means including a disc beneath said carrier having a row of recesses, two balls in diametrally opposite recesses, springs in bores in said carrier pressing down on the top of said balls, a hollow sleeve integral with and extending upwardly from said disc, a handle secured to the top of said sleeve, a slide block disposed beneath said disc and having a stem extending upwardly through said sleeve, and a nut on the top of said stem preventing disassemblage of said stem from said sleeve.

6. A turret head for a lathe comprising a carrier having four sides, each provided with a dovetail tongue, a vertical bore adjacent each side and opening through the side of the adjacent tongue, and a central bore, slide block means in said central bore for connecting said head to said lathe, a tool holder slidably mounted on each of said tongues, each of said holders having a vertically upstanding threaded stud, an inclined surface at the bottom of said carrier, a vertically slidable wedge adapted to be engaged against the said inclined surface of the carrier and a bolt rotatably engaged in the said wedge for locking said holder in position, a nut threaded on each of said studs, each of said nuts having a flange abutting the top of the adjacent bearing disc and adapted, when said cam portion does not lock the holder, to move the holder vertically dependent upon the direction of rotation of said nut, each of said eccentric pins having a groove in which the adjacent nut flange fits, the top wall of said groove having one flat side adapted, when turned toward said adjacent nut, to leave the flange of the nut uncovered whereby when said eccentric pin is rotated to lock said holder by its said cam portion said top wall of said groove overlies said nut flange, and means overlying the inner edges of said bearing discs, holding them against said carrier.

FRANK SIROLA.